(12) United States Patent
Szeto

(10) Patent No.: US 7,188,143 B2
(45) Date of Patent: *Mar. 6, 2007

(54) MESSENGER-CONTROLLED APPLICATIONS IN AN INSTANT MESSAGING ENVIRONMENT

(75) Inventor: Christopher Tzann-en Szeto, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 10/613,985

(22) Filed: Jul. 2, 2003

(65) Prior Publication Data

US 2004/0215731 A1 Oct. 28, 2004

Related U.S. Application Data

(63) Continuation-in-part of application No. 09/930,878, filed on Aug. 15, 2001, now Pat. No. 7,133,900.

(60) Provisional application No. 60/331,331, filed on Jul. 6, 2001.

(51) Int. Cl.
*G06F 15/16* (2006.01)
(52) U.S. Cl. ............ 709/206; 709/202; 709/204; 709/227; 715/751; 715/758; 707/104.1
(58) Field of Classification Search ........ 709/227–228, 709/204, 217–219, 238, 200, 201–207, 223–224, 709/250, 246–247; 719/328, 329; 370/259, 370/352, 353, 389, 400; 715/751–753, 758; 707/3, 10, 104.1; 455/518–519
See application file for complete search history.

(56) References Cited

U.S. PATENT DOCUMENTS

| | | | |
|---|---|---|---|
| 5,220,657 A | 6/1993 | Bly et al. | |
| 5,880,731 A | 3/1999 | Liles et al. | |
| 6,237,025 B1 | 5/2001 | Ludwig et al. | |
| 6,301,609 B1 | 10/2001 | Aravamudan et al. | |
| 6,430,602 B1 | 8/2002 | Kay et al. | |
| 6,487,583 B1 * | 11/2002 | Harvey et al. | ........ 709/204 |
| 6,493,724 B1 | 12/2002 | Cusack et al. | |
| 6,539,421 B1 | 3/2003 | Appleman et al. | |
| 6,564,246 B1 | 5/2003 | Varma et al. | |
| 6,564,249 B2 | 5/2003 | Shiigi | |
| 6,611,814 B1 | 8/2003 | Lee et al. | |
| 6,651,053 B1 | 11/2003 | Rothschild | |

(Continued)

OTHER PUBLICATIONS

International Searching Authority, "Notification of transmittal of the international search report and the written opinion of the international searching authority, or the declaration," International Application No. PCT/US2004/038354, dated Apr. 19, 2005, 13 pages.

(Continued)

*Primary Examiner*—Jeffrey Pwu
(74) *Attorney, Agent, or Firm*—Hickman Palermo Truong & Becker LLP

(57) ABSTRACT

Techniques for controlling an application in an instant messaging environment are described. The instant messaging environment retrieves and executes an instant messaging application. An identifier is assigned to the instant messaging application, which is retrieved and executed in the instant messaging environment between two or more instant messaging clients. The instant messaging environment identifies a selected instant messaging application and generates a control message. The control message includes the identifier which is used to retrieve and execute the instant messaging application. The instant messaging environment also determines whether a supporting application is required, based on the instant messaging application identifier, to execute the instant messaging application.

14 Claims, 18 Drawing Sheets

U.S. PATENT DOCUMENTS

| | | | |
|---|---|---|---|
| 6,677,976 B2 * | 1/2004 | Parker et al. | 348/14.08 |
| 6,747,970 B1 | 6/2004 | Lamb et al. | |
| 6,760,580 B2 | 7/2004 | Robinson et al. | |
| 6,781,608 B1 * | 8/2004 | Crawford | 715/758 |
| 6,807,565 B1 * | 10/2004 | Dodrill et al. | 709/206 |
| 6,816,884 B1 | 11/2004 | Summers | |
| 6,907,447 B1 | 6/2005 | Cooperman et al. | |
| 6,980,983 B2 | 12/2005 | Banerjee et al. | |
| 6,983,370 B2 | 1/2006 | Eaton et al. | |
| 7,028,262 B2 | 4/2006 | Estrada et al. | |
| 2003/0041108 A1 | 2/2003 | Henrick et al. | |
| 2003/0101235 A1 | 5/2003 | Zhang | |
| 2003/0208545 A1 | 11/2003 | Eaton et al. | |
| 2004/0117443 A1 | 6/2004 | Barsness | |
| 2004/0215731 A1 | 10/2004 | Tzann-en Szeto | |
| 2005/0086211 A1 | 4/2005 | Mayer | |

OTHER PUBLICATIONS

Current Claims, PCT/US2004/038354, 3 pages.

"Private-Label Instant Messaging Clients", Odigo Inc.. Retrieved from the Internet: http://corp.odigo.com/products/clients downloaded Oct. 9, 2001.

"Quicktime", Apple Computer, Inc. (2001) Retrieved from the Internet. http://www.apple.com/quicktime/ downloaded Oct. 10, 2001.

International Searching Authority, "Notification of the Transmittal pf the International Search Report and the Written Opinion of the International Searching Authority, or the Declaration," PCT/US04/21209, dated Aug. 09, 2005, 9 pages.

Current Claims, PCT/US04/21209, 4 pages.

http://corp.odigo.com/products/clients Web Page.

http://www.apple.com/quicktime/ Web Page.

"Instant Messaging: Convenient Chatting and Corporate Battling" retrieved on May 22, 2006 from the Internet<URL: http://www.glencoe.com/norton/n-instructor-/updates/1999/9799-4.html > 5 pages.

* cited by examiner

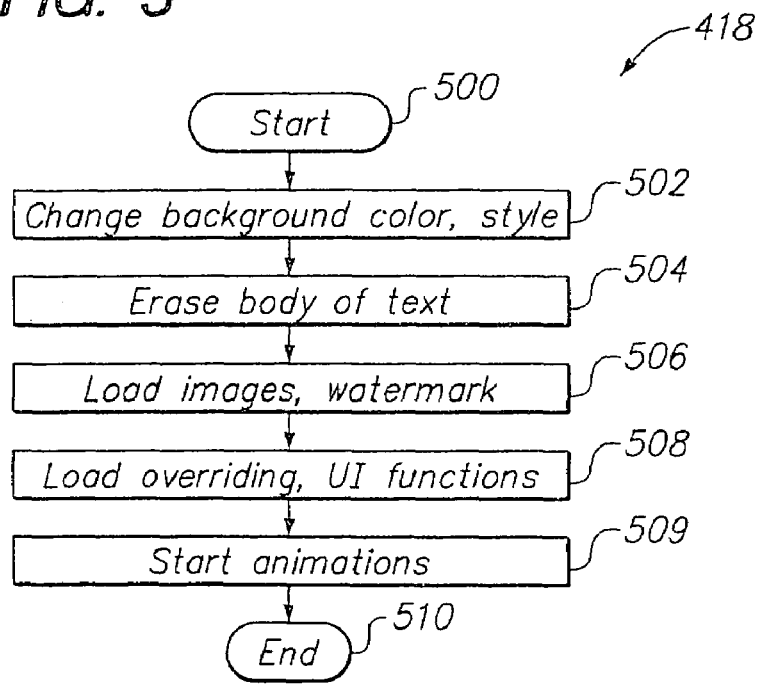
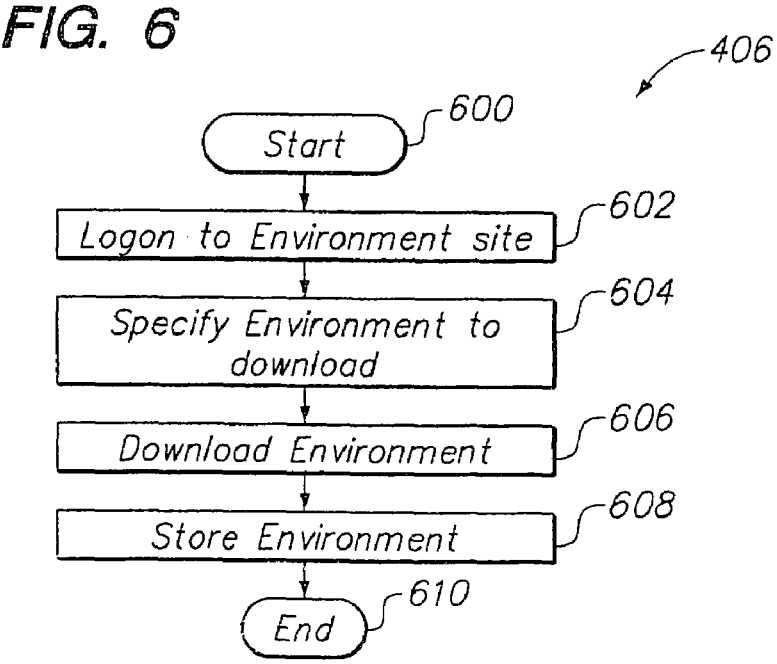

MESSENGER-CONTROLLED APPLICATIONS IN AN INSTANT MESSAGING ENVIRONMENT

CROSS REFERENCE TO RELATED APPLICATIONS

This application is a continuation in part of U.S. patent application Ser. No. 09/930,878 entitled "INSTANT MESSAGING ENVIRONMENTS" filed Aug. 15, 2001, now U.S. Pat. No. 7,133,900 which claims priority to U.S. Provisional Patent Application No. 60/331,331 entitled "INSTANT MESSAGING ENVIRONMENTS" filed Jul. 6, 2001, both of which are incorporated herein by reference for all purposes.

FIELD OF THE INVENTION

The present invention relates generally to a data transfer and application server system. More specifically, techniques for messenger-controlled applications in instant messaging environments are disclosed.

BACKGROUND OF THE INVENTION

Instant messaging has become one of the most popular applications on the Internet. Instant messaging programs generally allow users to send and receive messages. The messages are generated and displayed by an instant messaging client on each end and an instant messaging server may perform various functions to facilitate the transfer of messages for communication or conversation.

FIG. 1 is a diagram illustrating an instant messaging system operating over the Internet. An instant messaging client creates an instant messaging window 102 on a computer that generally includes a history window 104 containing messages that have been exchanged in the past, and a new text window 106 for new messages. In addition, the instant messaging client may display various menus and buttons that activate common instant messaging functions such as changing font, ringing another user, inserting symbols, etc. The instant messaging window also generally includes a space where the sender and the recipient of the message are identified.

A message server 112 is also connected to the Internet. In various instant messaging systems, the message server may perform different functions such as receiving messages and transferring them, replacing certain text with symbols, or otherwise modifying or relaying messages. A second instant messenger client also creates an instant messaging window 122 that also includes a history window and a new text window. Instant messaging window 122 displays a message sent from instant messaging window 102 via message server 112. It should be noted that software intended for implementing an instruction set in an instant messaging environment may be generally referred to as an instant messenger application or IM application.

Each instant messenger client provides for various commands to enable a user to interact with the instant messenger window in various ways, and, to some extent, configure the window to the user's taste. For example, the user may select a color for the history window from among various colors available to the user. In this manner, the user configures his instant messenger window to have a desired appearance. In addition, a user may turn certain features such as ringing, on or off.

The instant messaging client may also be configured to react to certain content, in a limited fashion, received as a message by running a routine or performing some function. For example, when a ring is received, the instant messaging client may be configured to react to the ring by playing a sound, shaking, or executing some other action. The instant messaging client may also be configured not to respond to such a ring. Also, the instant messaging client may be configured to insert an image or play a sound when certain text is included in a message. Thus, a user is generally able to exercise a certain amount of control over the appearance and operation of his instant messaging client. However, users are generally unable to affect the environment or state of another user's instant messaging client or window. Moreover, users are also generally unable to implement, execute, or control instant messaging applications in another user's instant messaging environment. Conventional messaging applications are generally limited to and based upon text contained in user messages exchanged between instant messaging users.

Thus, there are numerous problems which exist with regard to conventional techniques. Conventionally, users are unable to execute applications beyond an instant messaging environment to include other users engaged in the same instant messaging session. Users are generally only able to send messages and configure their own instant messaging applications to perform certain actions limited to the instant message content. Moreover, users are generally unable to configure, execute, and control applications in an instant messaging environment between two or more users. It would be useful if a reliable system and method could be provided for instant messaging users to execute and control applications in an instant messaging environment.

SUMMARY OF THE INVENTION

A system and method for messenger-controlled applications in an instant messaging environment is disclosed. An instant messaging environment may affect the execution and operation of an application in an instant messaging session. A sending instant messaging environment can specify an instant messaging environment identifier along with an application identifier and cause a receiving instant messaging application to implement a selected environment. The selected instant messaging environment may affect the state of the instant messaging application in a number of ways. The environment may affect how user interface commands are processed as well as the appearance of the instant messaging window and the manner in which information is sent and processed.

The environment may also determine the type of instant messaging application to be executed as well as an associated mode of execution. In some embodiments, an instant messaging application may be configured to automatically, semi-automatically, or manually execute. In other embodiments, instant messaging applications may require the use of a supporting application for execution. Instant messaging environments may be downloaded from one or more central instant messaging servers so that users may obtain new environments to specify to other users. When the instant messaging application receives an environment identifier for which the instant messaging application does not have the corresponding environment, that instant messaging application may also download the environment from the central instant messaging server. Likewise, when an instant messaging environment receives an identifier for an instant messaging application, the instant messaging environment can request and retrieve the selected instant messaging application based upon the application identifier.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a method is disclosed for selecting, at a first client, the application in the instant messaging environment, configuring an instant messaging control message for the application, including an identifier related to the application selected at the first client, sending the instant messaging control message to a second client, and executing the application in the instant messaging environment using the control message to retrieve the application from a server, unless the application has been previously called by the user.

In another embodiment, a method is disclosed for selecting a control feature in a first instant messaging environment, creating a control message based on selecting the control feature, and sending a control message from the instant messaging environment to a second instant messaging environment.

In yet another embodiment, a system is disclosed for an instant messaging environment for creating a control message and a messenger for sending or receiving the message and selecting an instant messaging environment in which to execute the application.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 5 is a flow chart illustrating in further detail a process that is executed when the start function is called in step 418 of FIG. 4;

FIG. 6 is a flow chart illustrating a process implemented to load an environment as shown in step 406 of FIG. 4;

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 2:
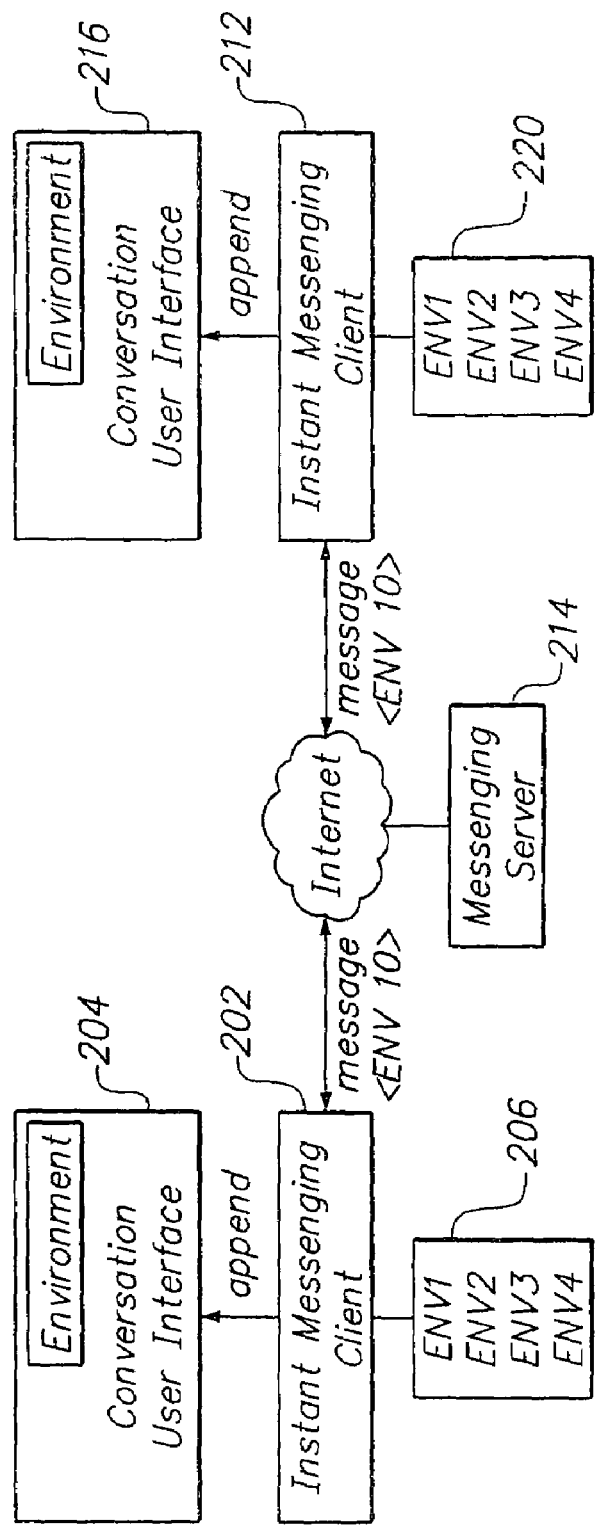
FIG. 2 is a block diagram illustrating an instant messaging system that implements instant messaging environments stored by instant messaging applications.

An instant messaging environment is a shared environment which exists between 2 or more instant messaging users. FIG. 2 is a block diagram illustrating an instant messaging system that implements instant messaging environments stored by instant messaging applications. It should be noted that, while this description refers extensively to instant messaging systems, the disclosed environments are also applied to other messaging systems in different embodiments. In general, an instant messaging system refers to any real time or near real time messaging or information exchange system. Many such systems will buffer messages sent to a participant who is temporarily unavailable or offline. A notification may be sent to the participant. An instant messaging environment may be specified by one instant messaging application to change the environment or state of another instant messaging application. A first instant messaging client, 202 interacts with a conversation user interface 204 that displays information to and receives messages from a user.

It should be noted that the term "application" as used herein is intended to refer to any client application, server application, distributed application, self contained application or combination thereof. An application may be implemented in any appropriate manner, including being embedded in a chip or being loaded into memory or firmware.

Figure 1:
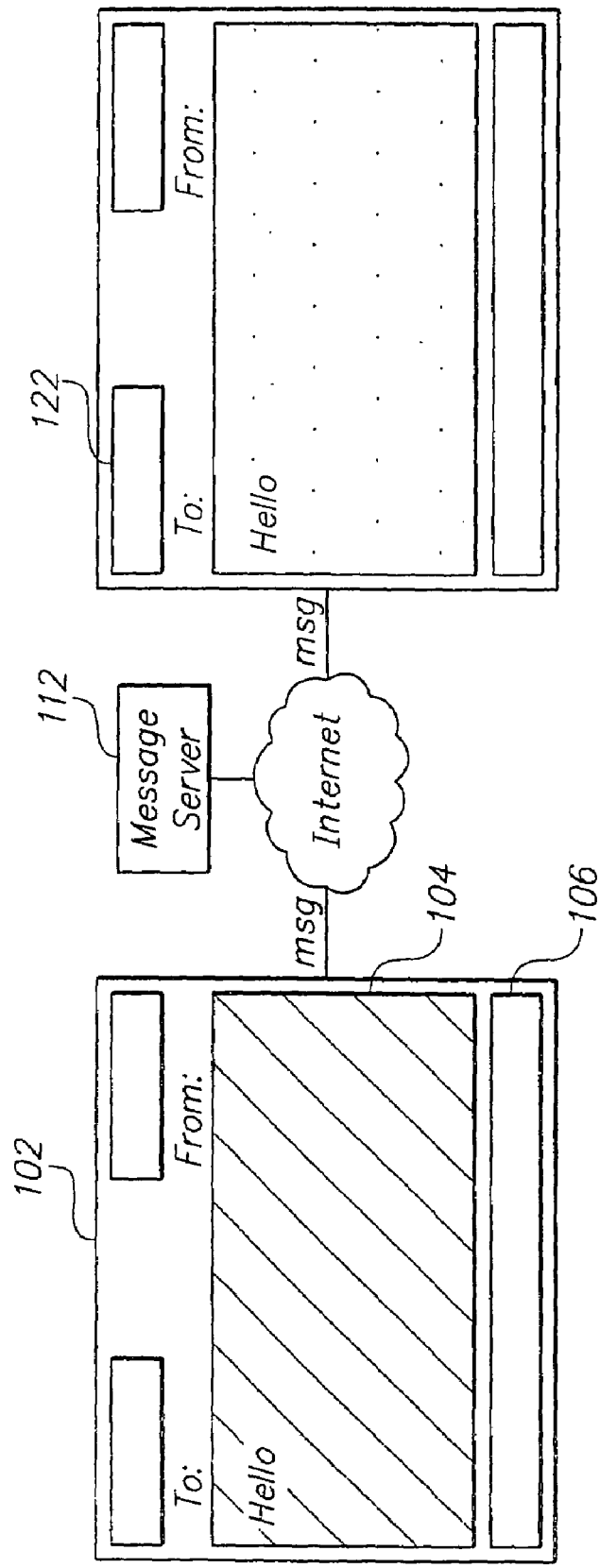
FIG. 1 is a diagram illustrating an instant messaging system operating over the Internet.

In some embodiments, the conversation user interface includes a conventional instant messaging window as shown in FIG. 1 with a history window for displaying previous messages and a new message window for composing new messages. In other embodiments, the conversation user interface may be dramatically different. For example, in one embodiment, the conversation user interface of the history window is modified to resemble a cartoon interface that shows the participants in instant messaging as comic characters or avatars having a conversation with text bubbles used to list messages back and forth. The conversation user interface may also include multiple history windows and other menus associated with instant messaging features such as buddy lists, formatting options, etc. Instant messaging environments as described herein may generally be applied to any type of conversation user interface used to display and author messages.

User interface commands are transferred from the instant messenger client to the conversation user interface to cause the conversation user interface to display instant messages and their corresponding environment to the user. For example, an append command is used to send a new message received from another instant messaging application to the conversation user interface. The append command may simply cause the received message to be added to a history window if a generic environment is selected. It should be noted that the phrase "user interface commands" as used herein is intended to encompass any functions, behaviors, actions, capabilities, etc. that are features of the user interface or the instant messaging window.

Other instant messaging environments may cause the append command to behave in different manners. For example, in the cartoon instant messaging environment, the append command would cause the last text bubble generated for the character corresponding to the message sender to disappear and for a new text bubble containing the current message to be created. Thus, the selected environment affects the state of the instant messaging application so that a user interface command specified by the instant messaging client may have different effects depending on the selected environment. A number of different environments may be stored in a cache 206.

In discussing the example shown, for the purpose of explanation, instant messaging client 202 will be described as sending a message to instant messaging client 212. In general, the two instant messaging clients will both send and receive messages in turn. Instant messaging client 202 sends a message that includes an environment identifier along with the message over the Internet. Throughout this specification, the Internet is referred to as a medium over which messages are sent. The disclosed system also operates over any other appropriate network or internetwork including wireless networks, proprietary networks, intranets, local area networks, or wide area networks. In one embodiment, instant messaging server 214 receives a message, processes the message and transfers the message to instant messaging client 212. In other embodiments, a peer to peer messaging system is implemented in which an instant messaging server need not necessarily become involved in transferring messages between instant messaging clients.

If a messaging server does process messages, then the messaging server may perform certain checks to determine whether the environment identifier as specified along with the message corresponds to a valid environment. In some embodiments, environments may expire as a result of a sponsorship or other type of agreement to maintain the environment lapsing.

The message along with the environment identifier is received by instant messaging client 212. Instant messaging client 212 also stores in a cache 220 various environments that it has obtained in the past. Instant messaging client 212 searches the cache for an environment that corresponds to the environment identifier received from instant messaging client 202. If a corresponding environment is found, then instant messaging client 212 changes the environment currently implemented by it.

The current environment affects how user interface commands sent from instant messaging client 212 to conversation user interface 216 are processed. In one embodiment, the instant messaging client may check whether or not an environment has expired before it implements that environment. If an environment has expired, then the instant messaging client may retrieve an updated environment from the instant messaging server or another specified source via the network.

Figure 3:
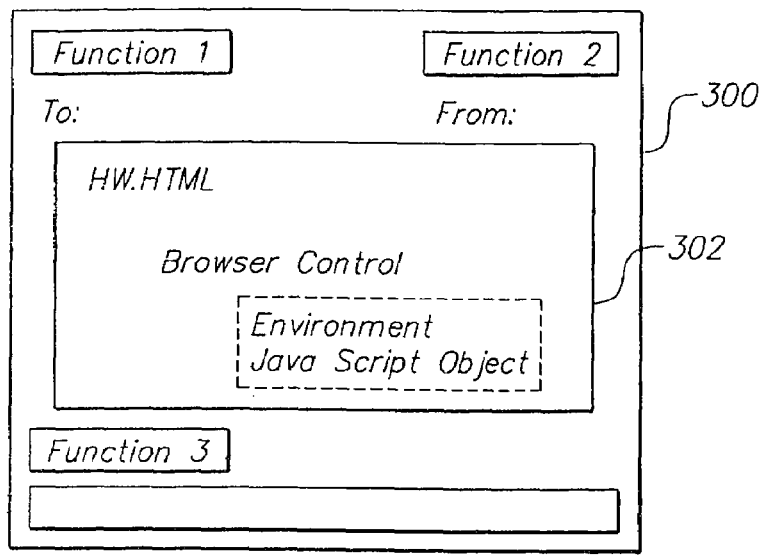
FIG. 3 is a diagram illustrating how an instant messaging environment is implemented using a browser control window.

FIG. 3 is a diagram illustrating how an instant messaging environment is implemented using a browser control window. It should be noted that a browser control window as used herein is intended to refer to any program control or set of controls that can interpret and render scripted pages. Also, any other appropriate system for rendering information may be used. Instant messaging window 300 is configured in a similar manner as a conventional instant messaging window with a TO field, a FROM field, and various function and menu buttons surrounding a history window 302. However, history window 302 is implemented in an unconventional manner. History window 302 is implemented using code in a browser control that processes an HTML file which contains the formatting for the history window and controls the appearance of the instant messaging cache that appears therein.

In one embodiment, the instant messaging environment is implemented by loading into memory one or more JavaScript objects that implement methods and behaviors that override the history window's default methods and behaviors. Of course, objects may be written in any appropriate programming language or system, such as ActiveX. In another embodiment, an Iframe that is not visible to the user includes JavaScript that implements the instant messaging environment. For example, if a message is received by the instant messaging client and an append function is called to add that message to the history window, then the environment embedded in the JavaScript code alters the way the browser control processes the append function. For example, the JavaScript may include a different version of the append function that causes text to be appended in a different manner than it would normally be appended if no environment were implemented by the code in the browser control. It should be noted that loading a JavaScript object without using an Iframe is generally preferred over the Iframe implementation for the sake of speed. This description refers to both implementations and it should be noted that when one implementation is referenced, that the other implementation (or any reasonable alternative implementation) may be used in different embodiments.

Once the code in the browser control has executed the modified append function contained in the environment, the environment may either allow the normal append function to be subsequently executed or may indicate that the normal append function should not be executed, essentially replacing the normal append function with the modified version. For example, an environment may cause a sound or visual effect to occur every time a new line is appended to the history window. In such a case, the environment would cause the browser control upon receiving the append function to first execute some JavaScript that would play the sound or create the visual effect and then return to the normal append function for the text to be appended in a conventional manner. In another example, such as the one described above where the history window includes cartoon characters and text bubbles that contain the appended text, the normal append function would be replaced by the append function contained in the environment and the normal append function would not be called upon completion of the executed environment code.

Thus, implementing code in a browser control within an instant messaging window that renders an HTML allows user interface commands to be redefined. Different environments are stored simply as different sets of code. The JavaScript contained in the environment redefines certain commands or functions by executing additional commands and then either calling or not calling the original function as desired.

It is important to note that, while the above described JavaScript code implementation of instant messaging environments has significant advantages, it is by no means the only manner in which instant messaging environments are implemented. In different embodiments, instant messaging environments are implemented by using different code structures. In general, a certain set of code representing the environment is accessed by the instant messaging application. The set of code is loaded in response to the specification of an instant messaging environment identifier by another instant messaging application. The environment may also be specified by the user of the application. By way of example and without limitation, instant messaging environments may be implemented using the wireless application protocol, XML, VRML, or any other appropriate public or private standard.

The specified environment alters the response of the instant messaging application to actions performed by the user. As shown in FIG. 2, in one embodiment, this alteration occurs by redefining commands or functions sent from the instant messaging client to the conversation user interface. As explained further in FIG. 3, in one embodiment, this may be implemented by using a browser control to render a history window and loading a JavaScript object that includes the function definitions. It should be apparent that many alternatives exist for implementing this system in a similar manner.

As a further example, another function that may be redefined is the scroll function. The user may indicate by dragging the mouse over an arrow button in the instant messaging window or by some other convenient means that he would like to scroll the history window. When such a scroll command is received, then a check is first made to determine whether or not the scroll command has been redefined by a loaded environment. For example, an environment may contain a watermark that is intended to always show up in the history window. In such a case, the scroll function would be redefined so that the watermark does not scroll within the window while the rest of the text inside the window does scroll.

As shown in FIG. 2, environment identifiers are passed between instant messaging applications by including an environment identifier along with each message. In one embodiment, there is a default environment identifier that is automatically passed between instant messaging applications if no environment has been specified by either of the users. Once one of the users specifies an environment, if the other user accepts the environment then that user will then pass the accepted environment identifier back to the user that originally specified the environment identifier, thus maintaining the environment. Environments may be selected by users in a variety of ways. For example, audio or video user inputs may be processed or used to select or modify an environment. Also, a robot or other program communicating with a user may select or modify an environment. Other context information about the user's system, a specified default environment or set of environments, or message content may select or modify an environment. One environment may select or modify another environment and a central instant messaging server may itself specify or modify an environment.

If an instant messaging application passes an environment identifier that is not accepted by the receiving instant messaging application, then the receiving instant messaging application will send back the default environment identifier and the sending instant messaging application may either change back to the default environment or maintain its own environment according to how it is configured. Thus, the instant messaging environment is either maintained or changed with each message passed back and forth containing an environment identifier.

Figure 4:
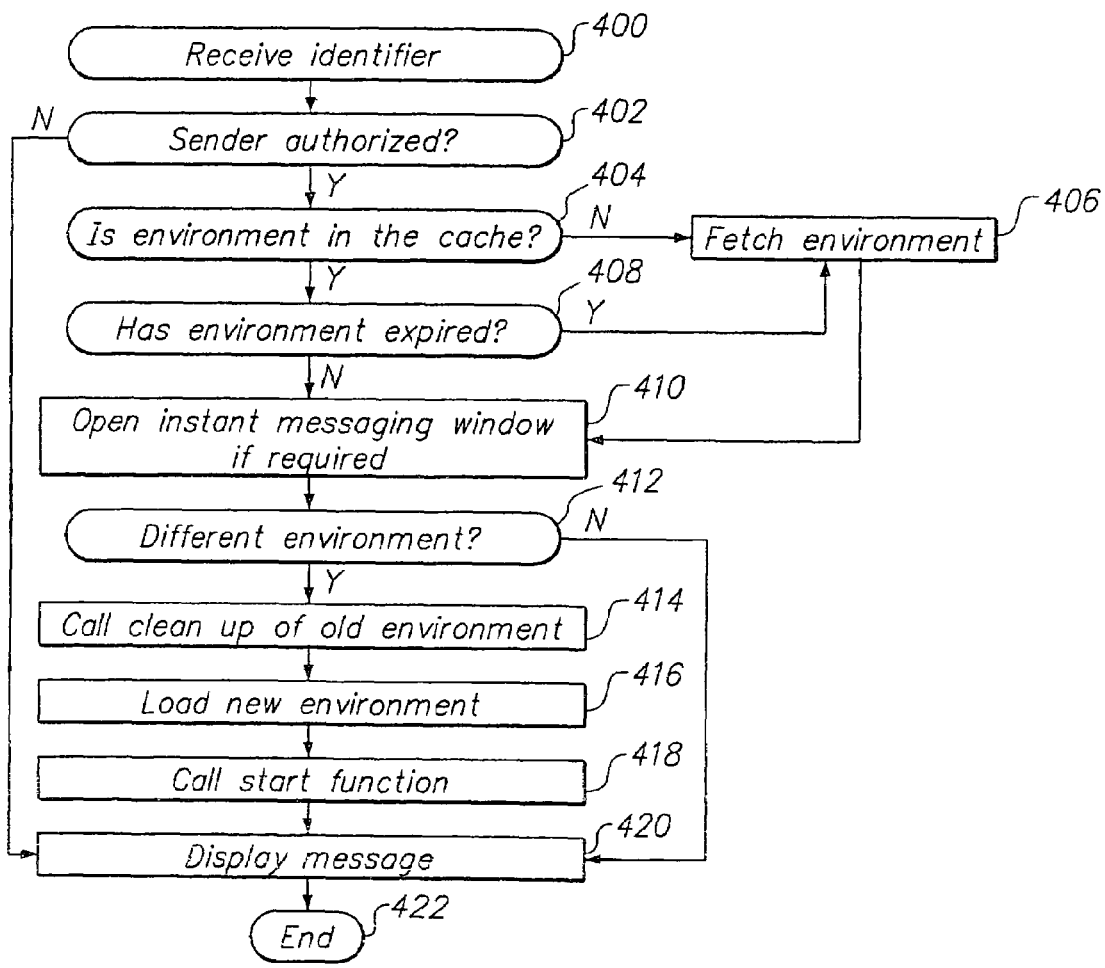
FIG. 4 is a flow chart illustrating a process executed by an instant messaging application when an environment identifier is received.

FIG. 4 is a flow chart illustrating a process executed by an instant messaging application when an environment identifier is received. The environment identifier is received in step 400. Next, in step 402, it is determined whether the sender of the identifier is an authorized sender. In one embodiment, this is determined by whether the sender is a member of a buddy list or other list maintained by the receiver of parties eligible to send environment identifiers and change the environment of the recipient's instant messaging application. If the sender is not authorized, then control is transferred to step 420 and the message is displayed.

If the sender is authorized, then control is transferred to step 404 and it is determined whether the environment is already cached by the receiving instant messaging application. If the environment is not cached by the receiving instant messaging application, then control is transferred to a step 406 where the environment is fetched. In one embodiment, the environment is loaded by accessing a website that makes environments available for download. The environment identifier may be sent to the website to identify the environment to be downloaded. In other embodiments, the environment may be obtained from the sender and an authentication code or signature may be used to verify the integrity of the environment. Once the environment is downloaded, then control is transferred to step 410. If the environment is in the cache, then control is transferred from step 404 to step 408 and it is determined whether the environment has expired.

In one embodiment, environments that are not found in a local cache are obtained from a secure source, such as a trusted website. This secure mode of distribution prevents parties from using environments for hostile purposes. Since instant messaging participants merely refer to environments and the referred to environments are separately obtained from a trusted source, participants do not intentionally or inadvertently send damaging environments to each other.

In one embodiment, whenever an environment is downloaded by an instant messaging application, an expiration date is also provided to the instant messaging application so that the instant messaging application can determine if the environment has expired. In another embodiment, the instant messaging application is required to always check with an instant messaging server to determine whether an environment has expired before that environment is implemented.

If the environment has expired, then control is transferred to step 406 and the environment is loaded. If the environment has not expired, then control is transferred to step 410 and an instant messaging window is opened if an instant messaging window is currently not open. Control is then transferred to step 412 where it is determined whether a different environment has been specified by the received environment identifier. If a different environment has not been specified, then the currently loaded environment may continue to be used and control is transferred to step 420 where the message is displayed.

If the environment is different, then control is transferred to step 414 and a clean up function is called for the old environment. Control is then transferred to step 416 and the new environment is loaded into memory. Next, in step 418, the start function is called for the new environment so that any code that should be executed when the new environment is loaded is executed. Control is then transferred to step 420 and the message is displayed. The process ends at 422.

In one embodiment, an environment is downloaded from a website by receiving a series of different types of files. The first type of file is an initialization file that contains information regarding the environment that the instant messenger application can access without actually loading the environment. The initialization file may contain items such as a display name that determines how the environment will be listed in a formatting tool bar used to select environments and an expiration that can be used by the instant messaging application to determine that the environment is invalid and initiate a download of an updated version of the environment.

The second type of file is the actual environment program file that contains, in one embodiment, encoded JavaScript that defines how the environment looks and behaves. The third type of file generally downloaded is media file such as an image file, video clip, animation, sound clip, etc. that provides images or other media that are generally used by the environment. In different embodiments, the different types of files are encrypted or compressed either together or separately and encapsulated or signed as is deemed appropriate. The files may be sent together using the .zip or the .cab or other archive or compression format, if desired. Preferably, at least the JavaScript objects are encrypted.

FIG. 5 is a flow chart illustrating in further detail a process that is executed when the start function is called in step 418 of FIG. 4. The process begins at 500. In step 502, the background, color and style of the instant messaging window is changed to the background, color and style of the environment that has been selected. In step 504, the body of text is erased. It should be noted that in some environments, the body of text may not be erased but in other environments the body of text may need to be erased. For example, in the cartoon environment shown above, only the current message being conveyed is shown in a text bubble. Next, in step 506, any images and watermarks associated with the environment are loaded. Then, in step 508, any overriding user interface functions are loaded so that when a user interface command is received, the function called by the command may be changed to the function specified by the instant messaging environment. In step 509, any animations (such as falling snowflakes as shown below) associated with the environment are started. The process ends at 510.

FIG. 6 is a flow chart illustrating a process implemented to load an environment as shown in step 406 of FIG. 4. The process starts at 600. In a step 602, the application logs on to a website that includes environments available for download. In step 604, the application specifies an environment to be downloaded. In one embodiment, the same environment identifier used by applications to identify environments to each other is used to identify an environment to download. In a step 606, the environment is downloaded. The environment is stored in step 608. The process ends at 610.

Requiring that the instant messaging environment be downloaded from one or more central sites enables editorial control to be exercised over the environments that are sent to users. Obscene environments or other undesirable environments can be avoided. Also, viruses and other malicious code can be excluded. In certain embodiments, users may be allowed to create environments and send them to other users, but it is an important feature that in some embodiments, there is at least one mode where environments are only downloaded from a trusted or controlled source that ensures security and, if desired, some control over content. One important use of instant messaging environments is advertising. When an instant messaging environment includes an ad, controlling the source of the environment facilitates tracking of the environment use as well as making sure that the environment is not altered.

It should be noted that when the environment is downloaded, data in the initialization file for the environment may be separately stored in a table or system registry so that information about loaded environments may be readily accessed by the instant messaging application without opening files. For example, if an expiration date is associated with the environment, then that date may be written into an expiration table so that the instant messaging application can periodically perform clean up and delete expired environments or check before an environment is accessed whether or not it has expired. Likewise, the names of various download environments may be stored in a single table used to create a list of environments for a menu that facilitates the selection of environments by a user.

Figure 7:
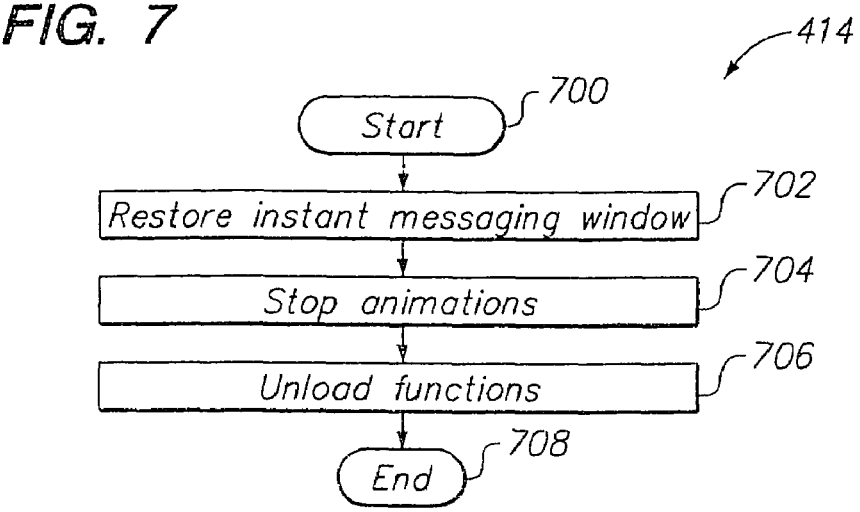
FIG. 7 is a flow chart illustrating a process implemented to clean up an old environment.

FIG. 7 is a flow chart illustrating a process implemented to clean up an old environment. The process starts at 700. In a step 702, the instant messaging window is restored to a default state. That may involve, for example deleting a watermark created by the old environment. The default state may include a default background color, font, style, etc. In step 704, any animations or other routines are stopped. In a step 706 redefined functions that replace user interface commands are unloaded. The process then ends at 708. It should be noted that other clean up operations may typically be included in a clean up process.

Figure 8:
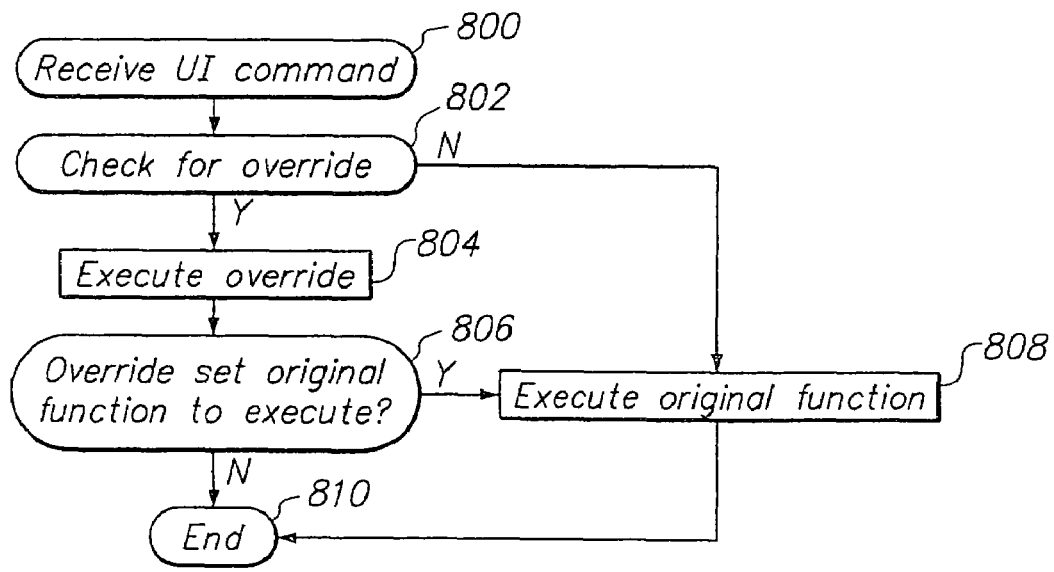
FIG. 8 is a flow chart illustrating a process executed by the instant messaging application in response to a user interface command.

FIG. 8 is a flow chart illustrating a process executed by the instant messaging application in response to a user interface command. The process starts at 800 when the user interface command is received. In step 802, it is determined whether an overriding or modified function has been defined by the currently loaded environment. If no overriding function is defined, then control is transferred to a step 808 and the original function is executed. If an overriding or modified function does exist, then control is transferred to step 804 and the overriding function is executed. Control is then transferred to a step 806 where it is determined whether the overriding function has set the original function to execute once it has been completed. If the original function is to execute, then control is transferred to step 808 and the original function is executed. If the original function is not to be executed, then control is transferred to step 810 and the process ends.

Sending environment identifiers between instant messaging applications and using the environment identifiers to change the environment of a receiving application has been described. Once this capability of redefining user interface command functions, executing animations and creating event driven actions to occur in an instant messaging window has been enabled, a rich variety of environments can be defined for instant messaging applications. Some examples of instant messaging environments that may be created are provided in FIGS. 9A through 9C.

Figure 9A:
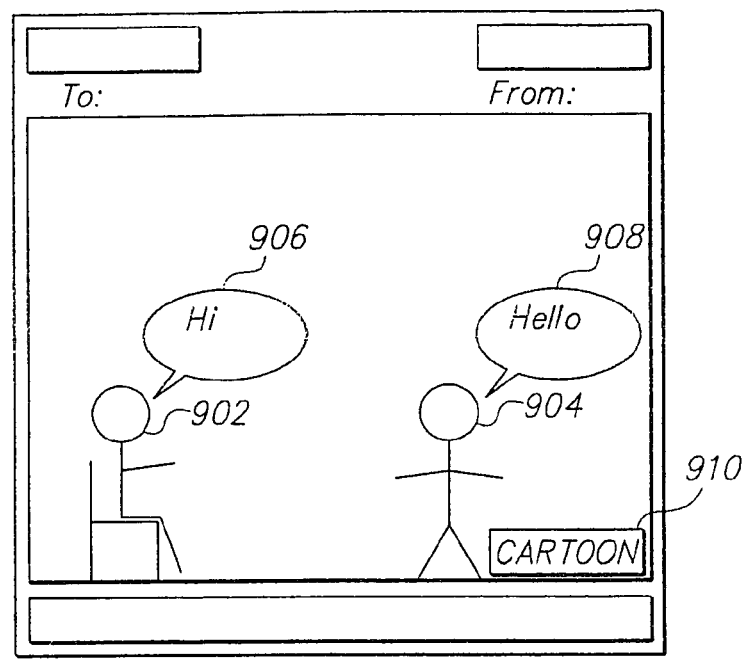
FIG. 9A is a diagram illustrating a cartoon instant messaging environment such as the one described above.

FIG. 9A is a diagram illustrating a cartoon instant messaging environment such as the one described above. Characters 902 and 904 represent participants in the instant messaging session and text bubbles 906 and 908 display the last message sent by each of the participants. This environment is implemented by redefining the append function to delete an existing text bubble above the character representing the sender of the text message and then insert the message being sent into a new text bubble. In addition, the start function of the environment deletes all text in the history window and draws in the characters that are part of the cartoon. In addition, a watermark 910 is provided that shows the name of the cartoon that is the theme of the environment. In many embodiments, the watermark also functions as a link so that a user may link to a website related to the environment. This technique is especially useful when the environment is part of an ad campaign.

The instant messaging server may track statistics about environments for various reasons. For example, if an environment has an advertisement theme associated with it, then each time the environment is specified by a user to another user that event may be counted by the server so that ad revenue can be generated. In addition, when certain functions within the environment are called as a result of events, the instant messaging server may record such occurrences as well and those events may also generate ad revenue.

Figure 9B:
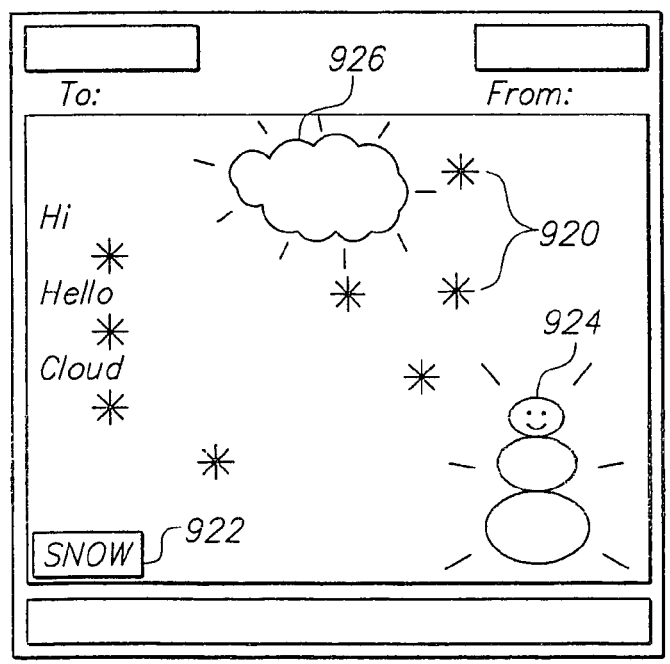
FIG. 9B is a diagram illustrating an environment where a snow theme has been implemented.

FIG. 9B is a diagram illustrating an environment where a snow theme has been implemented. Animated snowflakes 920 fall down the window so long as the environment is active. In addition, a watermark 922 is present that provides a link to a site related to snow. Also, when the ring or buzzer function is called by one of the users, then instead of the general ringing, a snowman 924 appears and flashes. Also, when certain text is typed in the window such as the word cloud, a cloud 926 appears.

Figure 9C:
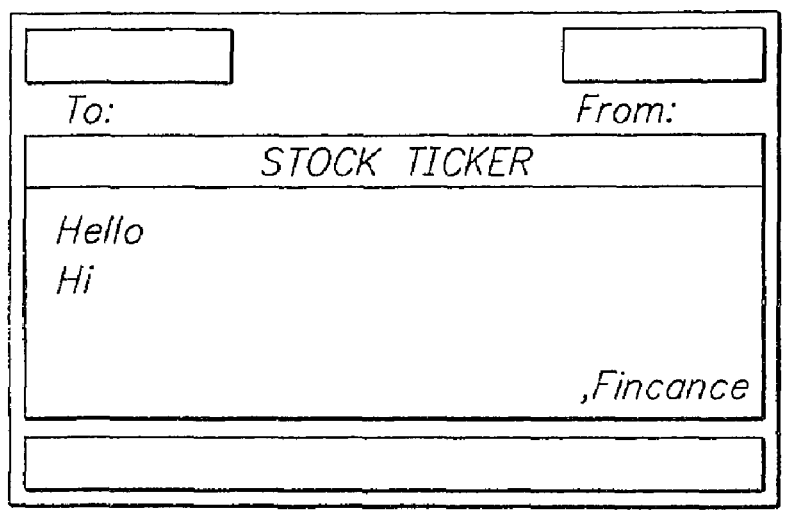
FIG. 9C is a diagram illustrating another environment where the ability of an environment to interact with another application is illustrated.

FIG. 9C is a diagram illustrating another environment where the ability of an environment to interact with another application is illustrated. In the environment shown, a stock ticker obtains information from either the instant messaging program, a browser, or other program that makes stock information available to user. In addition, the environment includes a finance watermark link that directs the user to a financial site. In this environment, when the environment is loaded, a function is periodically executed that checks for data from the stock ticker application. In addition, environments can communicate information to other environments by sending messages. Also, environments can read certain information available to a messenger program such as a buddy list or in some cases stock quote information.

Figure 10A:
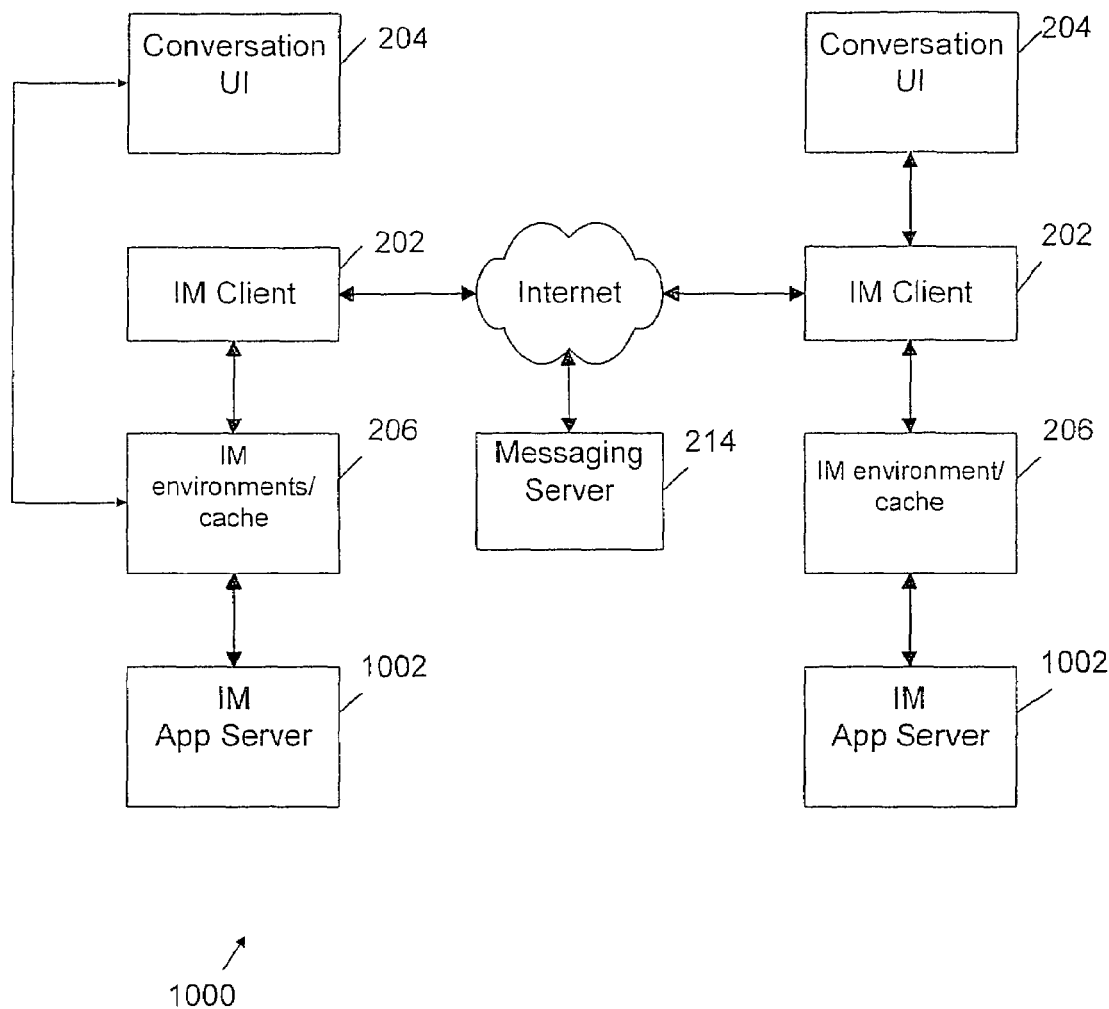
FIG. 10A is a diagram illustrating an exemplary instant messaging system that implements messenger-controlled applications.

FIG. 10A is a diagram illustrating an exemplary instant messaging system 1000 that implements messenger-controlled applications. Messenger-controlled applications may also be referred to generally as instant messaging or IM applications. As described above in connection with FIG. 2, instant messaging (IM) clients 202 are shown using the Internet for transferring data. Clients, referring to end user applications or instant messaging user applications, provide an implementation environment for messenger-controlled or IM applications. Conversation user interfaces (UI) 204 provide users with interfaces for creating, reviewing, editing, or modifying content to send between IM clients 202. In the embodiment shown, an IM application may be executed between IM clients 202 using an IM message. This will be described in further detail below. As described in FIG. 2, IM environments are stored in cache 206. Also provided are IM application servers 1002 for implementing IM applications as will be described below. Also generally, an IM application is any application implemented in an instant messaging environment.

Figure 10B:
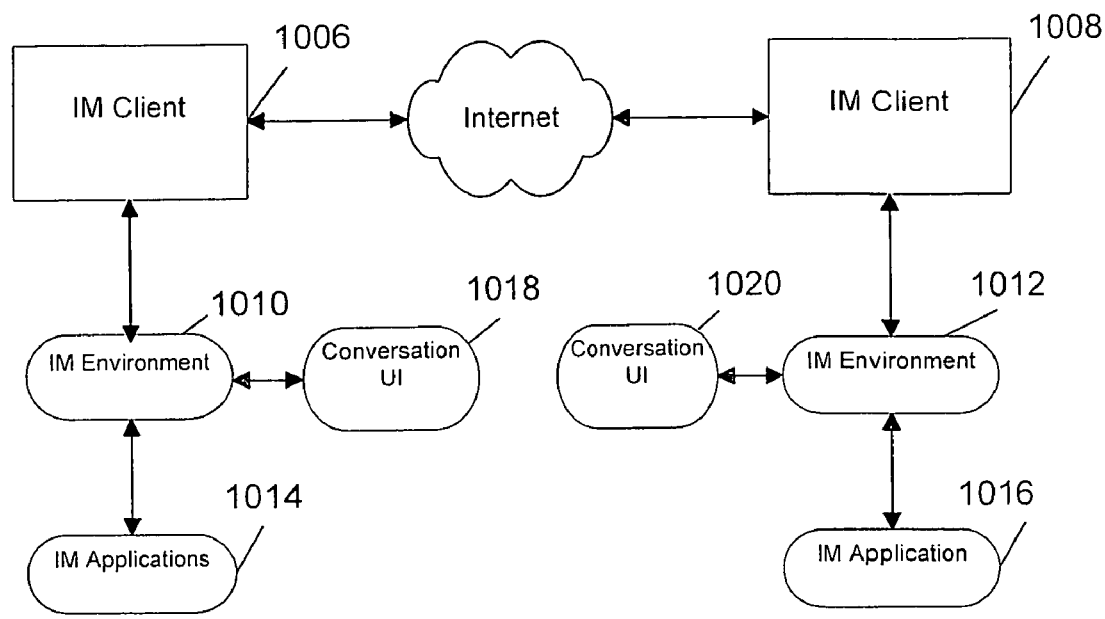
FIG. 10B is a diagram illustrating an alternative embodiment of an instant messaging system.

FIG. 10B is a diagram illustrating an alternative embodiment of an instant messaging system. Also communicating over the Internet, IM clients 1006, 1008 implement IM environments 1010, 1012. IM applications 1014, 1016 can be implemented over IM environments 1010, 1012. An IM session is executed using conversation interfaces 1018, 1020.

Figure 10C:
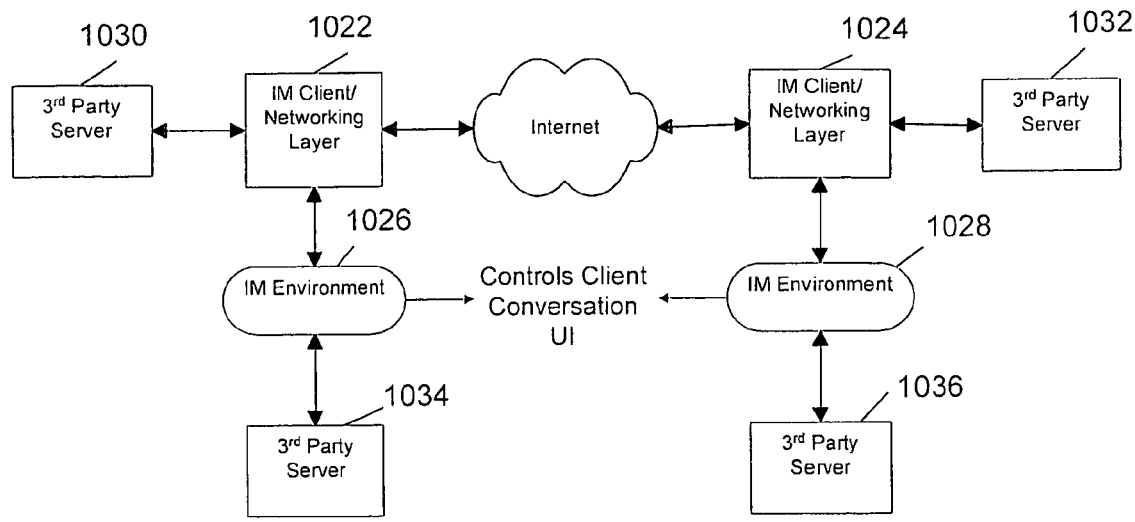
FIG. 10C is a diagram illustrating another embodiment of an instant messaging system using third-party servers.

FIG. 10C is a diagram illustrating another embodiment of an instant messaging system using third-party servers. IM clients/networking layers 1022, 1024 can implement IM environments 1026 and 1028, also executing IM applications which may be stored on third-party servers 1030, 1032, 1034, and 1036. Similarly, an IM session may be controlled or managed using client conversation user interfaces, similar to the conversation interfaces 1018, 1020 in FIG. 10B.

Figure 11:
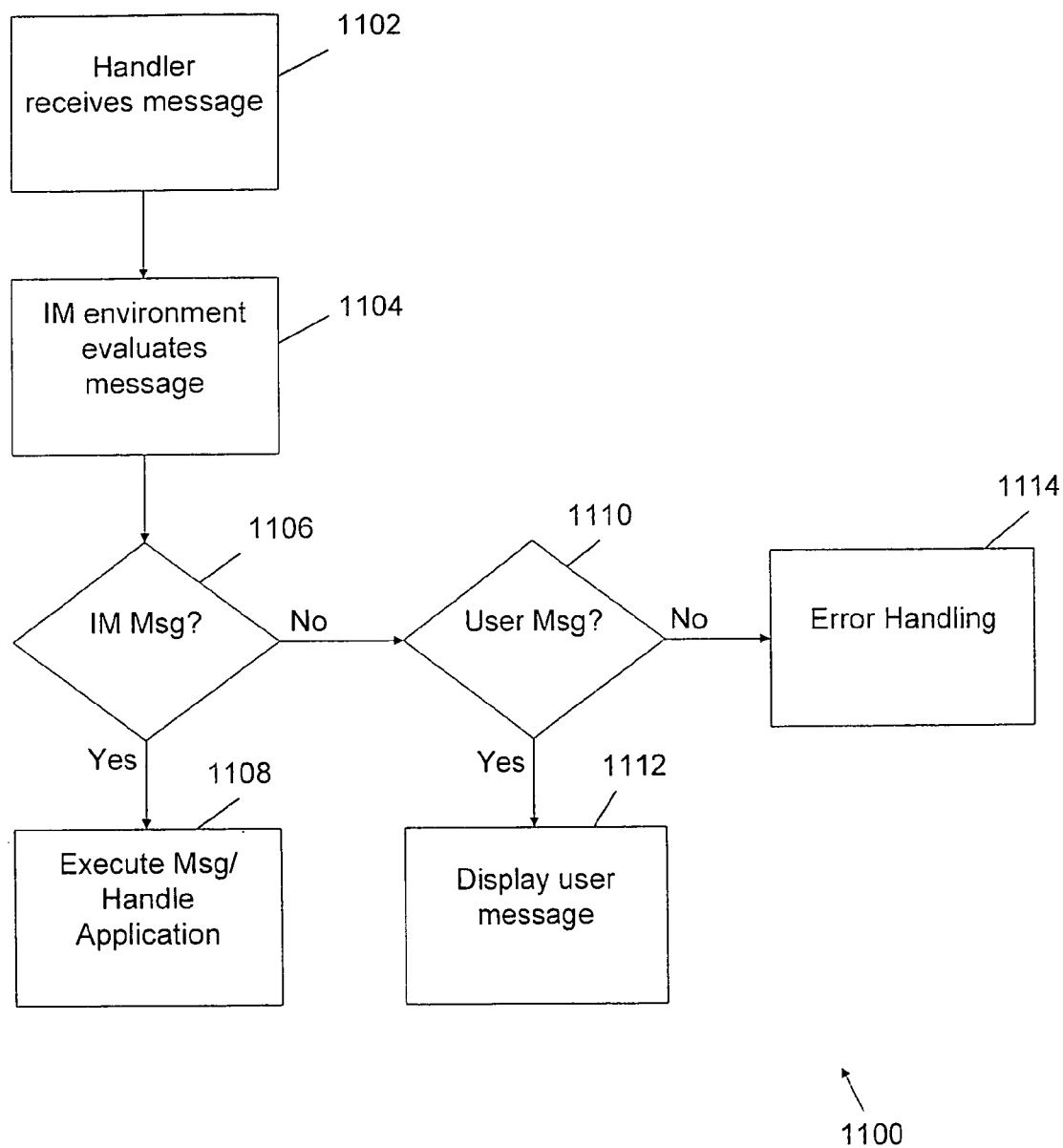
FIG. 11 is a flow chart illustrating an exemplary process 1100 for handling message-borne applications in an IM environment.

FIG. 11 is a flow chart illustrating an exemplary process 1100 for handling message-controlled applications in an IM environment. In the preferred embodiment, data and information passed between users in the form of a message. Applications and data may also be considered "messages" and can be passed between IM clients 202 as "IM messages." In step 1102, handlers in IM clients 202 receive messages. IM environments then evaluate the received message and determine an appropriate action for user and IM messages, as shown in step 1104. In step 1106, IM environments determine whether the message is an IM message. IM messages refer to messages useful in the execution and operation of IM applications. Conversely, messages between users (user messages) refer to communication messages between end users engaged in an IM session.

If an IM message is determined above, then an IM application (i.e. movie trailer, video, etc.) is executed. If the message is not an IM message, then IM environments determine whether the message is a user message in step 1110. If the message is a user message, then the message is displayed via IM client 202 on conversation user interface 204. If the message is neither an IM message nor a user message, then error handling is invoked, in step 1114.

Figure 12A:
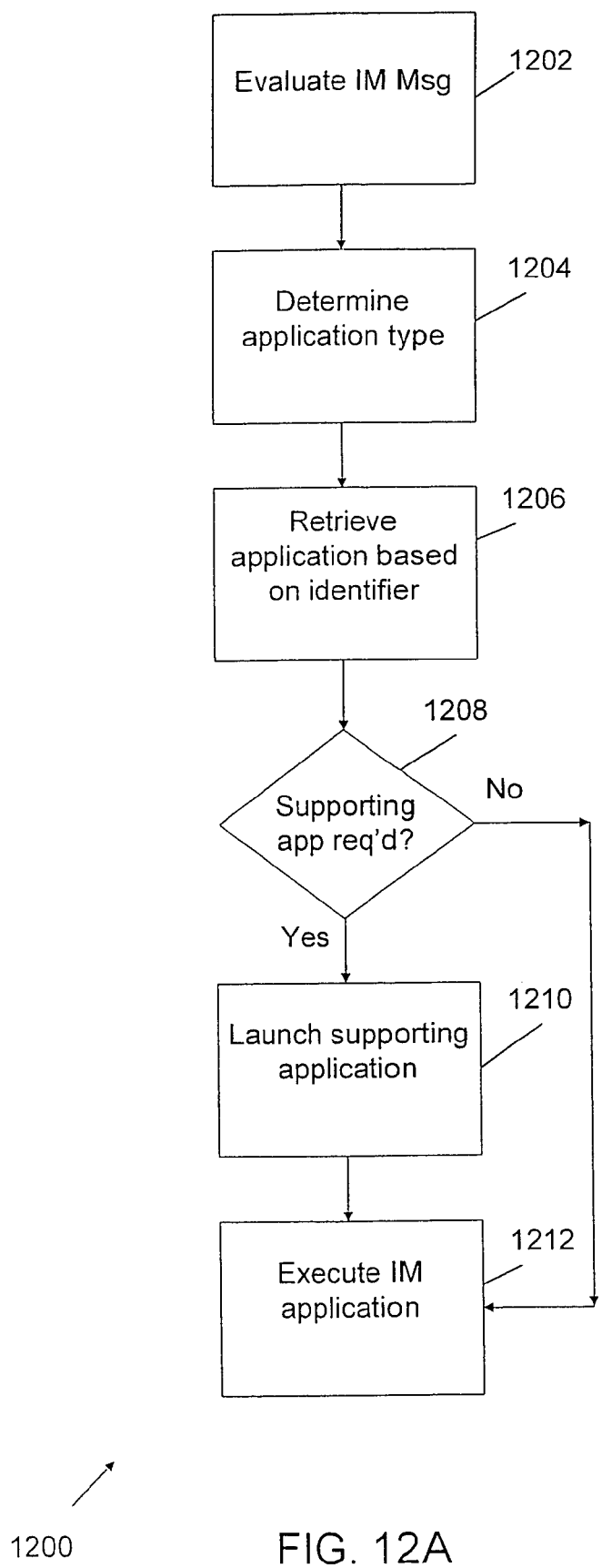
FIG. 12A is a flow chart illustrating the control and execution of IM applications in an instant messaging system, in accordance with one embodiment of the present invention.

FIG. 12A is a flow chart illustrating the control and execution of IM applications in an instant messaging system, in accordance with one embodiment of the present invention. In step 1202, IM client 202 (FIG. 2 or 10) evaluates an IM message. From the IM message, the IM client 202 determines the application type (i.e., movie trailer, game, animated cartoon, advertisement, Flash presentation, etc.) in step 1204. Using an identifier, the IM application is retrieved in step 1206. In step 1208, a decision is made as to whether a supporting application is required such as a media player (Real Player, Windows Media Player), content viewer (Adobe Illustrator, Reader, etc.), or other media-based display application. If required, the supporting application is launched in step 1210. If a supporting application is not required or if the supporting application has been launched, then the IM application is implemented/executed in step 1212. Alternative embodiments pertinent to the type of IM application implemented are shown in FIGS. 12B through 12D.

Figure 12B:
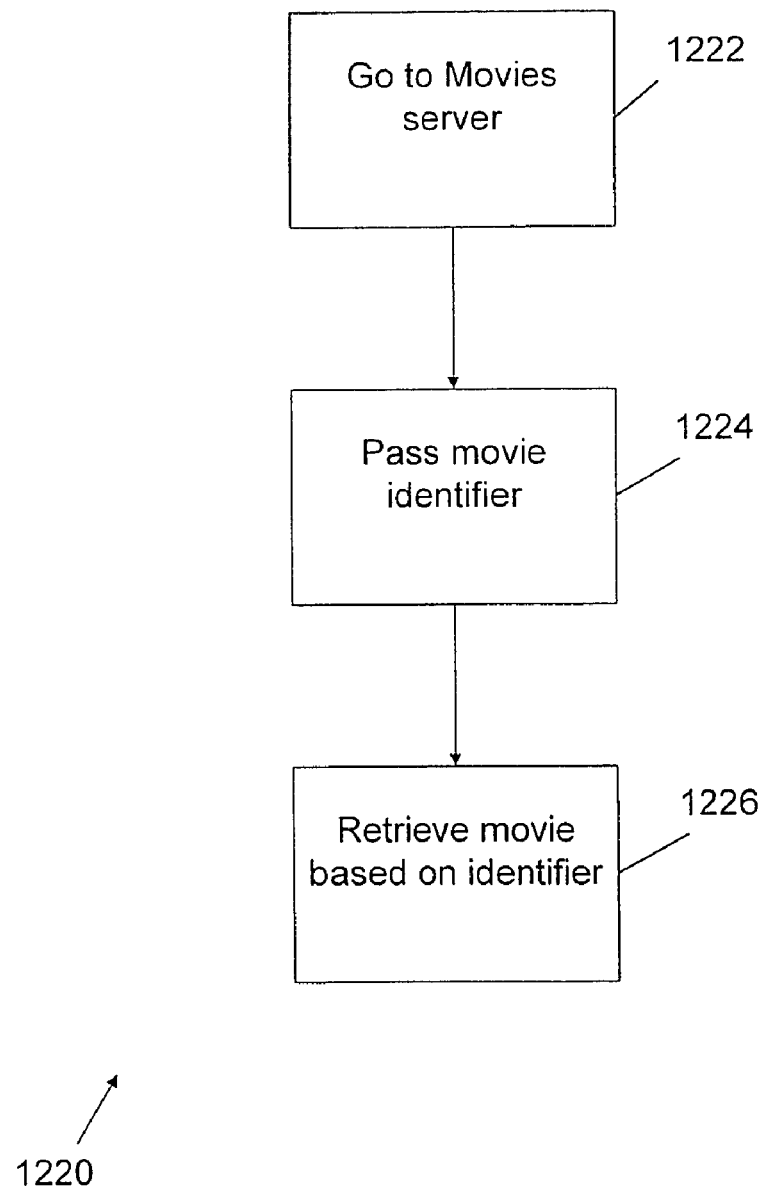
In FIG. 12B, an exemplary flow chart for implementing a messenger-controlled IM application such as a movie trailer is shown.

In FIG. 12B, an exemplary flow chart for implementing a messenger-controlled IM application such as a movie trailer is shown. In step 1222, the IM client 202 is directed to retrieve the identified IM application (e.g., a movie trailer) from a movie server such as IM application server 1002 (FIG. 10). A movie trailer identifier is passed to the movie server in step 1224. Based upon the identifier, a movie trailer or set of movie trailers may be retrieved in step 1226. Upon retrieving the movie trailer, IM client 202 then returns to step 1208 (FIG. 12A).

Figure 12C:
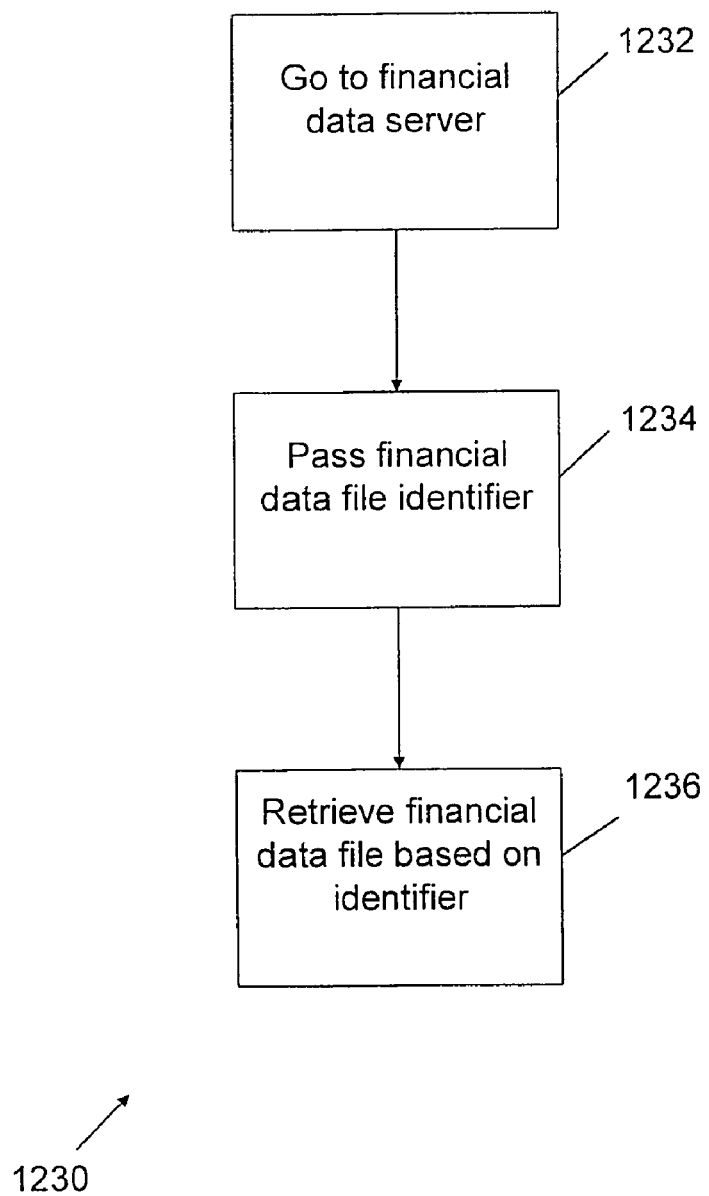
FIG. 12C illustrates another exemplary flow chart for implementing a messenger-controlled IM application which yields financial data such as a stock quote, earnings indicator, or other financial data.

FIG. 12C illustrates another exemplary flow chart for implementing a messenger-controlled IM application which yields financial data such as a stock quote, earnings indicator, or other financial data. In step 1232, IM client 202 can be implemented using a server, database, RAID, storage disk, repository, etc. where the financial data application is stored. An identifier is passed, which identifies the specific financial data to be retrieved, such as a stock quote, public earnings figure, or other similar data in step 1234. The financial data is retrieved in step 1236 using the identifier passed by IM client 202.

Figure 12D:
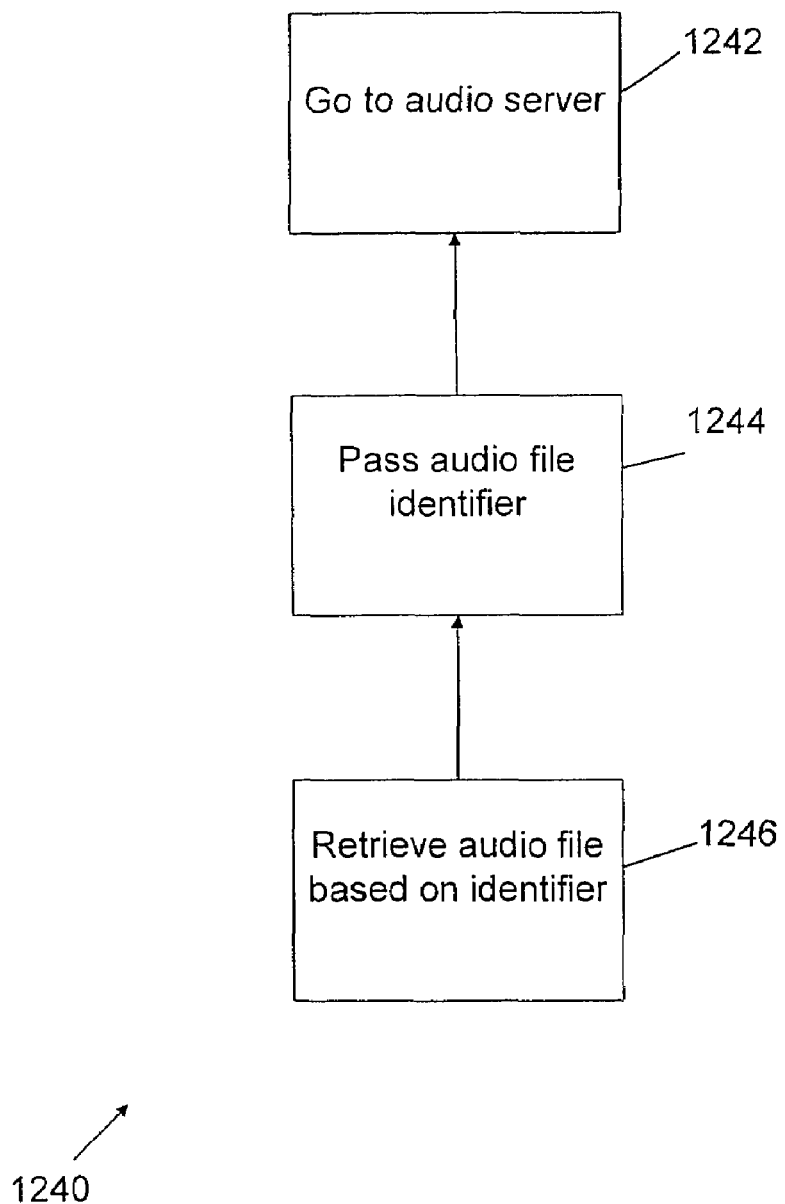
FIG. 12D illustrates another exemplary flow chart for implementing a messenger-controlled IM application such as an audio file (e.g., song, recording, etc.)

FIG. 12D illustrates another exemplary flow chart for implementing a messenger-controlled IM application such as an audio file (e.g., song, recording, etc.). IM client 202 is directed to an audio server storing files of music, songs, recordings, etc. in various formats such as WAV files, MPEG3 files, etc. Passing an identifier to the audio server (i.e., IM application server 1002), IM client 202 can retrieve an audio file in step 1246. Subsequently, IM client 202 continues at step 1208 of the process illustrated in FIG. 12A.

Figure 13:
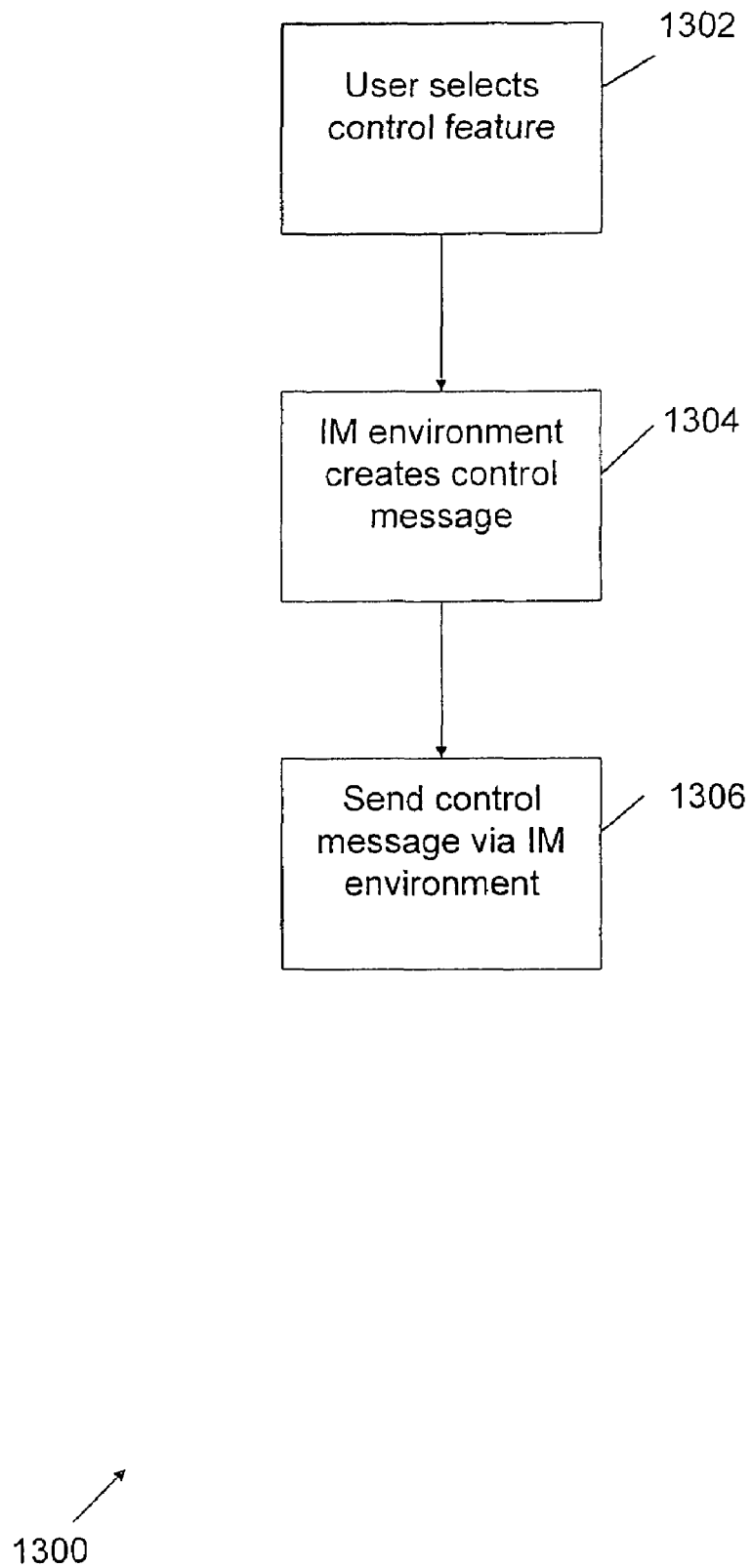
FIG. 13 is a flow chart illustrating an exemplary IM application control process in accordance with one embodiment of the present invention.

FIG. 13 is a flow chart illustrating an exemplary IM application control process in accordance with one embodiment of the present invention. In step 1302, a user can direct IM client 202 to implement a control feature which will control an IM application. In the context of FIG. 13, a control message is similar to the above-discussed IM message. IM environment creates a control message in step 1304. The control message is sent to IM client 202 which implements the requested IM application, in step 1306.

Figure 14A:
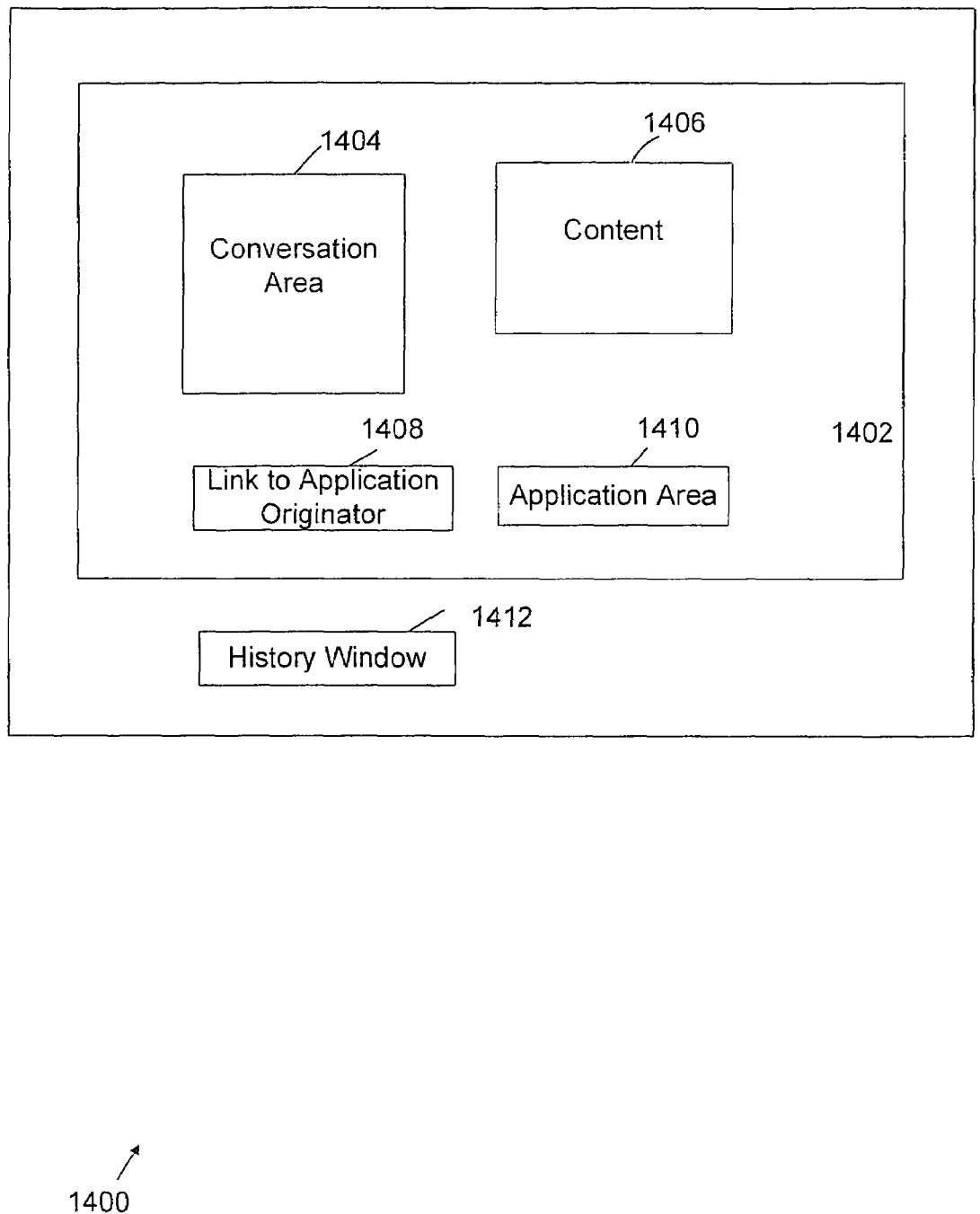
FIG. 14A is an exemplary user interface for controlling IM applications in accordance with one embodiment of the present invention.

FIG. 14A is an exemplary user interface for controlling IM applications in accordance with one embodiment of the present invention. A computer monitor screen 1400 is shown, containing a history window 1402. History window 1402 is similar to the history window 302 illustrated and discussed above in connection with FIG. 3. Within history window 1402, browser control elements and features are shown. For example, in the embodiment shown several framed areas are provided. In the embodiment shown, several I-frames are provided including a conversation area 1404, content window 1406, a link frame 1408 and an application area 1410.

Control features such as those discussed in connection with the process flow chart of FIG. 13 may be included in any of the frames/windows shown. For example, in application area 1410, a graphic link may be provided which, when directed, executes an application which plays a movie trailer (in accordance with the process described above for FIG. 12B). In another example, a stock "ticker" may be played in application area 1410, displaying company symbols and financial stock quotes. Users can control IM applications using an interface similar to that shown in FIG. 14A (1400). In other embodiments, other techniques are used to implement control of messaging applications other than those described here and the embodiments listed above are intended to be neither comprehensive or inclusive of other applications that may be controlled from an IM environment.

Figure 14B:
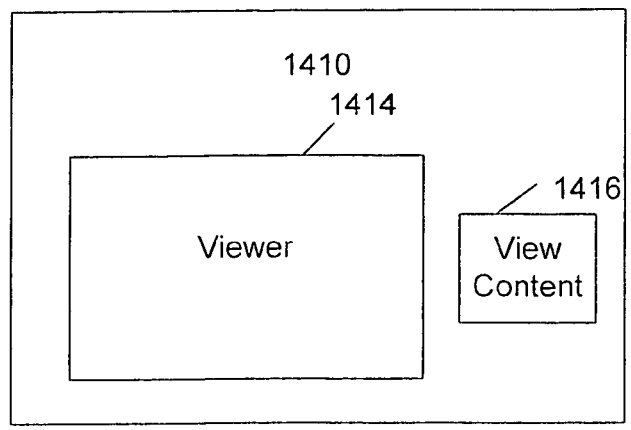
FIG. 14B illustrates another exemplary embodiment of application area 1410 for viewing content.

FIG. 14B illustrates another exemplary embodiment of application area 1410 for viewing content. A viewer window 1414 is provided for viewing or displaying content such as a movie trailer, film clip, animated story or advertisement, or video file in any of a number of formats including, but not limited to, MPEG4, Macromedia Flash, etc. A viewer button 1416 is provided which, when depressed, will launch an appropriate viewer/player, rendering the IM application/content for display to the user.

Figure 14C:
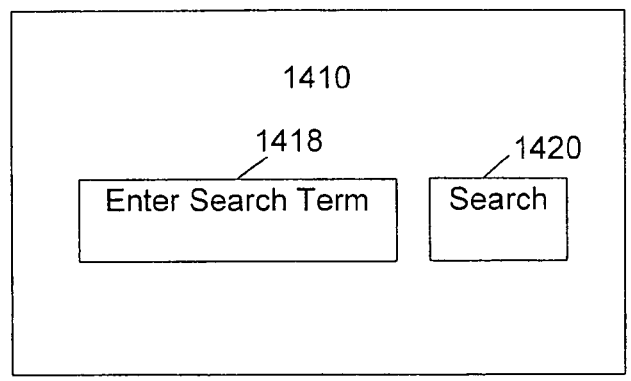
FIG. 14C illustrates another exemplary embodiment of application area 1410 for entering a search term and performing a search based on the search term.

FIG. 14C illustrates another exemplary embodiment of application area 1410 for entering a search term and performing a search based on the search term. In search term frame 1418, a user may enter a search term. After depressing search button 1420, an IM application is launched which executes the desired search based on the entered search term, returning and rendering the results in a frame on interface 1400. The frame may include, but is not limited to those shown in FIG. 14A. For example, returned search results may be included in content window 1406, application area 1410, or conversation area 1410. Search results and terms may be placed in frames other than those shown in the embodiments described herein.

Figure 14D:
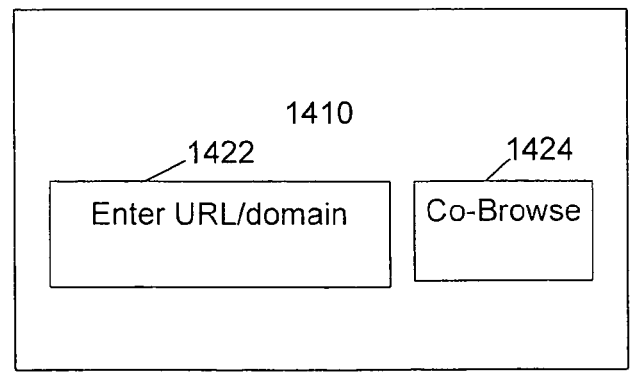
FIG. 14D illustrates another exemplary embodiment of application area 1410 for executing search functionality such as co-browsing, in an IM environment.

FIG. 14D illustrates another exemplary embodiment of application area 1410 for executing enhanced functionality such as co-browsing in an IM environment. Co-browsing, or two or more users browsing for online content while engaged in an IM environment, is provided for as a messenger-controlled IM application. URL/domain frame 1422 is configured to received a URL or domain name for pointing an IM application such as a web browser to a particular Internet or website. In one embodiment, the IM environment may launch a web browser once the co-browse button 1424 is depressed. Once a co-browsing session has been initiated, two or more users will be directed to the same Internet or website based upon the destination URL/domain name entered into URL/domain frame 1422. Browsers such as those provided by Microsoft (Internet Explorer), Netscape (Navigator), etc. may be used. Other internet browsing applications are used in other embodiments.

Control of IM applications such as co-searching, co-browsing, networked games, shared videos or audio files may be implemented in an automatic, semi-automatic, or manual manner. Information related to the control of IM applications uses IM messages which, when passed between IM clients, causes particular actions/interactions to occur between two or more IM users. The IM messages enable and control IM applications, which is widely varied in terms of functionality and user interactivity. IM applications may include co-searching, co-browsing, site navigation, co-drawing, media sharing (e.g., video, music, animation, photos, etc.), games, and activities in other embodiments. The IM applications can be hosted on servers communicating with the instant messaging clients, which may be operated by a variety of entities such as a content developer, hosted service, service provider, etc.

Procedures and techniques for messenger-controlled applications in instant messaging environments have been described. A number of exemplary environments that may be created using these procedures and techniques have also been shown. In addition to being used in instant messaging environments between two users, the techniques described herein may also apply to instant messaging environments that include one, three, or more users.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A machine-implemented method of controlling an application, said method comprising:
   in response to receiving user input at a first instant messaging client and a second instant messaging client, generating user messages at the first instant messaging client and the second instant messaging client, wherein the first instant messaging client has a first conversation user interface and the second instant messaging client has a second conversation user interface;
   exchanging the user messages, via an instant messaging system, between the first instant messaging client and the second instant messaging client;
   displaying a conversation in the first conversation user interface and the second conversation user interface, wherein said conversation is based on the user messages transferred via the instant messaging system;
   in response to user input at the first instant messaging client, generating a control message at the first instant messaging client, wherein the control message indicates an identifier associated with an application that is retrieved and executed from the first instant messaging client
   transferring the control message, via the instant messaging system, between the first instant messaging client and the second instant messaging client; and
   in response to receiving the control message, causing results of executing the application as specified by the control message to be reflected in a display provided by the second instant messaging client.

2. A method as recited in claim 1, further comprising:
   determining whether a message received at the second client is one of the user messages or the control message.

3. A method as recited in claim 1 wherein the step of causing results of executing the application as specified by the control message to be reflected in a display provided by the second instant messaging client comprises playing results of executing the application in a player.

4. A method as recited in claim 1 wherein the step of causing results of executing the application as specified by the control message to be reflected in a display provided by the second instant messaging client comprises displaying the results of executing the application in a viewer.

5. A method as recited in claim 1 further comprising arbitrating data received from a third instant messaging client based on executing the application.

6. A method as recited in claim 1 further comprising, prior to generating the control message, receiving a selection of the application from a list of instant messaging applications at the first instant messaging client.

7. A method as recited in claim 1 further comprising causing results of executing the application to be reflected in a display provided by the first instant messaging client.

8. A computer-readable storage medium carrying one or more sequences of instructions, wherein execution of the one or more sequences of instructions by one or more processors causes the one or more processors to perform the steps of:
   in response to receiving user input at a first instant messaging client and a second instant messaging client, generating user messages at the first instant messaging client and the second instant messaging client, wherein the first instant messaging client has a first conversation user interface and the second instant messaging client has a second conversation user interface;
   exchanging the user messages, via an instant messaging system, between the first instant messaging client and the second instant messaging client;
   displaying a conversation in the first conversation user interface and the second conversation user interface, wherein said conversation is based on the user messages transferred via the instant messaging system;
   in response to user input at the first instant messaging client, generating a control message at the first instant messaging client, wherein the control message indicates an identifier associated with an application that is retrieved and executed from the first instant messaging client
   transferring the control message, via the instant messaging system, between the first instant messaging client and the second instant messaging client; and
   in response to receiving the control message, causing results of executing the application as specified by the control message to be reflected in a display provided by the second instant messaging client.

9. A computer-readable storage medium as recited in claim 8, further comprising instructions which, when executed by the one or more processors, cause the one or more processors to perform the step of determining whether a message received at the second client is one of the user messages or the control message.

10. A computer-readable storage medium as recited in claim 8 wherein the instructions for performing the step of causing results of executing the application as specified by the control message to be reflected in a display provided by the second instant messaging client further comprise instructions for playing results of executing the application in a player.

11. A computer-readable storage medium as recited in claim 8 wherein the instructions for performing the step of causing results of executing the application as specified by the control message to be reflected in a display provided by the second instant messaging client further comprise instructions for displaying the results of executing the application in a viewer.

12. A computer-readable storage medium as recited in claim 8 further comprising instructions which, when executed by the one or more processors, cause the one or more processors to perform the step of arbitrating data received from a third instant messaging client based on executing the application.

13. A computer-readable storage medium as recited in claim 8 further comprising instructions which, when executed by the one or more processors, cause the one or more processors to perform the step of:
   prior to generating the control message, receiving a selection of the application from a list of instant messaging applications at the first instant messaging client.

14. A computer-readable storage medium as recited in claim 8 further comprising instructions which, when executed by the one or more processors, cause the one or more processors to perform the step of causing results of executing the application to be reflected in a display provided by the first instant messaging client.

* * * * *